June 26, 1956
C. C. S. LE CLAIR
2,752,006
LUBRICANT INJECTION UNIT
Filed Aug. 14, 1952
4 Sheets-Sheet 1
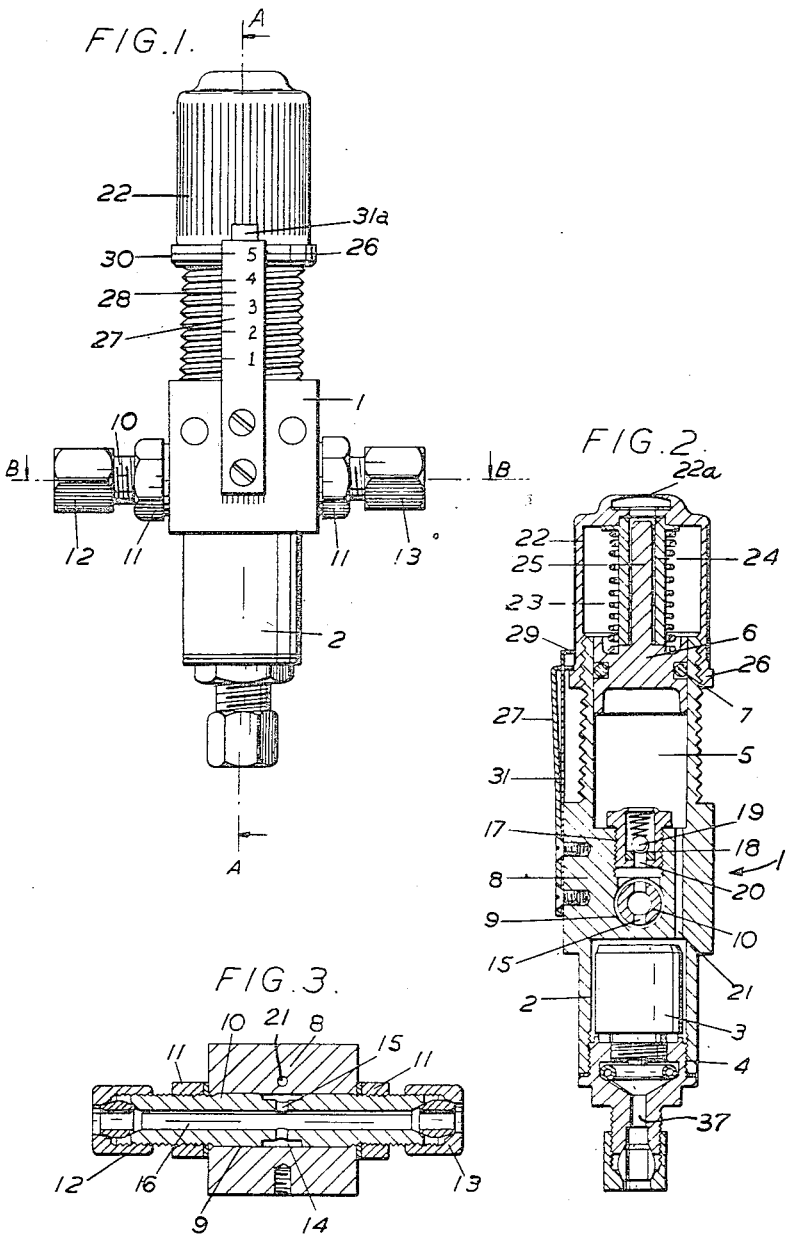
Inventor:
Camille Clare Sprankling Le Clair
By Ahlberg, Wuppers & Bradolph
Attorneys.

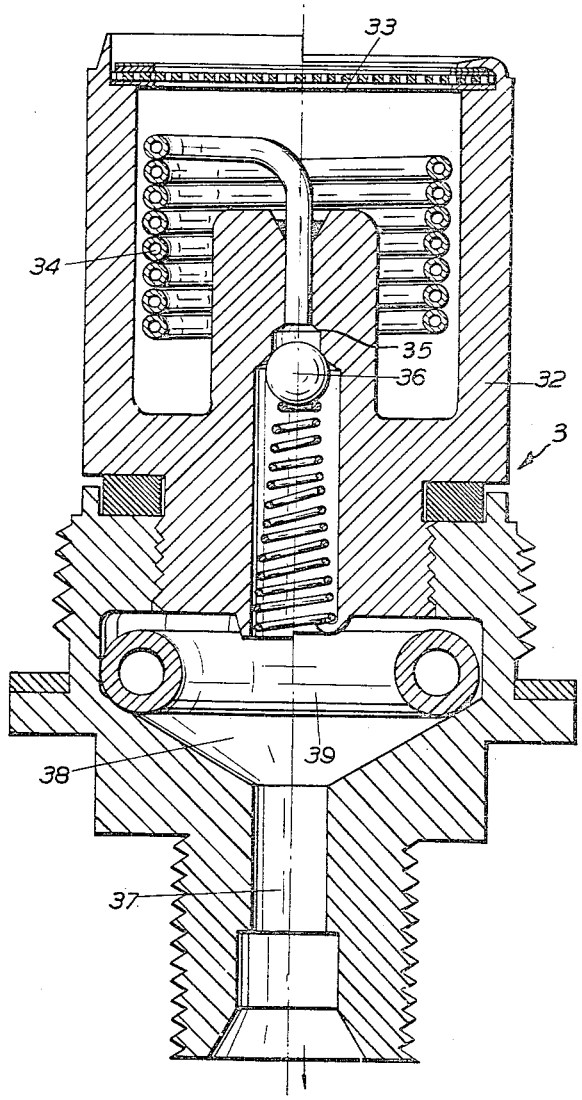

June 26, 1956  C. C. S. LE CLAIR  2,752,006
LUBRICANT INJECTION UNIT
Filed Aug. 14, 1952  4 Sheets-Sheet 3
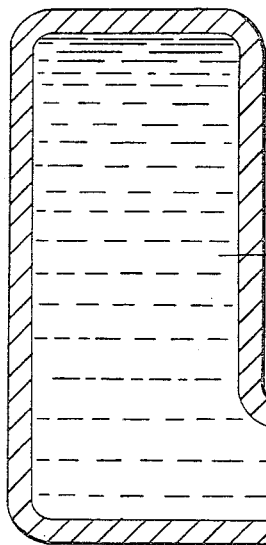
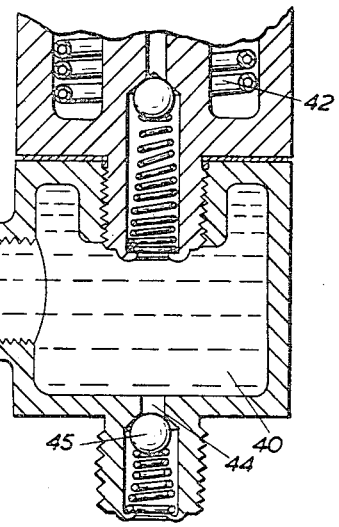
FIG. 5.
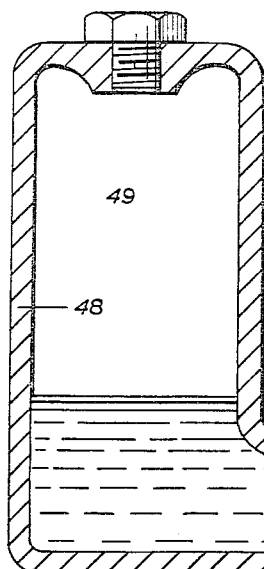
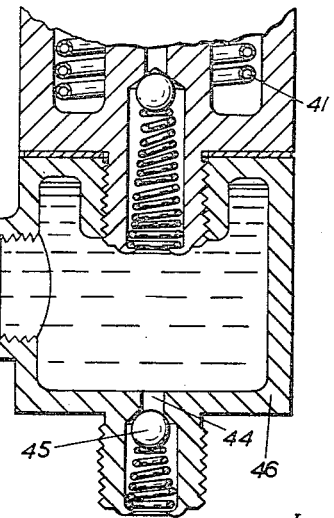
FIG. 6.
Inventor:
Camille Clare Sprankling Le Clair
By Ahlberg, Wupper & Gradolph
Attorneys

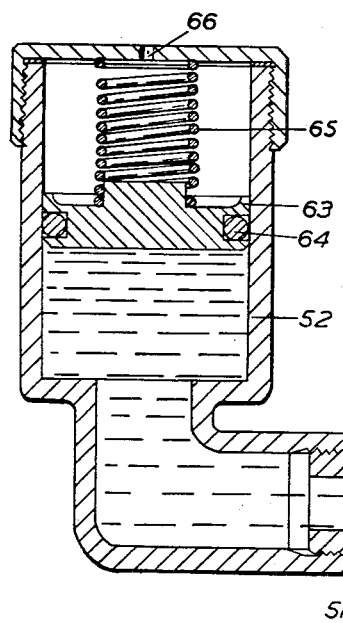
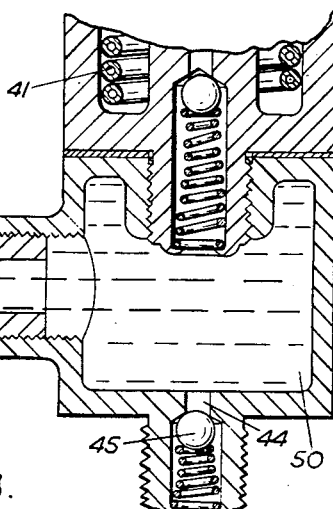
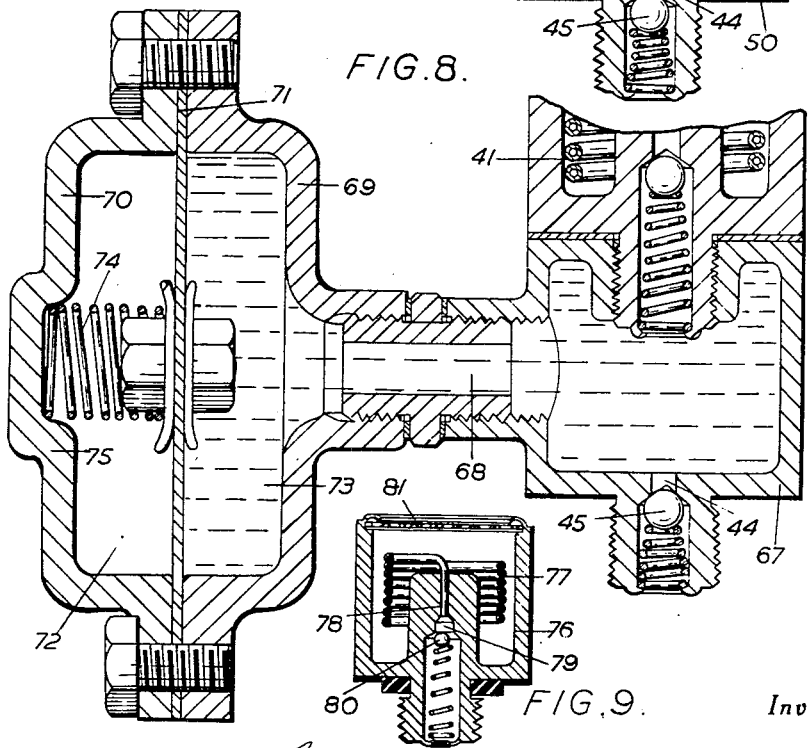

United States Patent Office 2,752,006
Patented June 26, 1956

2,752,006
LUBRICANT INJECTION UNIT

Camille Clare Sprankling Le Clair, Toronto, Ontario, Canada, assignor to Tecalemit Limited, Brentford, England Application August 14, 1952, Serial No. 304,415

5 Claims. (Cl. 184—7)

This invention relates to improvements in, or modifications of, the invention described and claimed in our copending prior patent application No. 223,923 filed May 1, 1951, now abandoned, that is to say to lubricant and liquid distributions systems for use in automobile vehicles and machinery of the type in which a main lubricant carrying conduit is provided with branch conduits carrying lubricant, such as oil, to bearings and other parts requiring lubrication. Hereinafter such lubricant and liquid distribution systems will be referred to as "lubricant distribution systems."

In the above mentioned prior application there is described and claimed a metering device for use in a lubricant-distributing system, which comprises a tube having a bore of capillary dimensions and which is relatively long and has a proportionately large diameter, the inlet end of the tube receiving lubricant from a main conduit which is connected to a source of supply of lubricant under pressure and the discharge end of the tube being adapted to supply lubricant to a place of use of the lubricant, the arrangement being such that the required pressure drop exists between the ends of the tube and such that the pressure drop is large in comparison with the pressure drop over the length of the main conduit.

The capillary tube may be coiled into a helical or spiral or spring-like form and the metering device may comprise an acceptance chamber with which the discharge end of the capillary tube communicates and which communicates with the lubricant outlet of the device, and a compressible or resilient means or medium located in the chamber so that, during the application of transient pressure to the lubricant in the main conduit, lubricant from the capillary tube is discharged into the chamber and the pressure of the lubricant at the discharge end of the tube is determined by the resistance to compression or distortion of the said means or medium and not under normal conditions by the resistance at the place of use of the lubricant, the lubricant in the chamber being slowly fed between pressure impulses to the place of use under a pressure exerted upon it by the said means or medium.

The present invention provides an injector unit comprising the combination of a metering device, as described and claimed in our said prior application No. 223,923, and means for receiving a measured quantity of lubricant from the lubricant supply line before it is fed into the metering device, from which latter it is discharged to the bearing or other place of use.

The said means may consist of a cylinder formed in the body of the unit and adapted to be connected to the oil supply line through an oil supply conduit, and a piston slidable in the cylinder. The cylinder is connected to, and is open to, a housing formed in the body of the unit to receive the metering device.

In one constructional form of the invention the piston is spring-urged so as to force the contents of the cylinder into the metering device when the pressure imposed on the oil in the cylinder is relieved.

It is also preferred to provide means whereby the quantity of lubricant received in the said cylinder may be varied. In a constructional form of the invention, which will be described hereinafter, the said means consists of a stop which is arranged for axial adjustment on the injector unit body and which conveniently consists of a hollow cap screwed upon the latter. In this construction means visible from the exterior of the injector unit are provided for indicating the various quantities of oil that may be received in the said cylinder. Means may also be provided for locking the cap against movement due to vibration and so on.

In the above mentioned constructional form of the invention the cylinder is connected to the housing of the metering device by means of a conduit formed in a solid part of the body of the injector unit and a non-return valve is provided between the outlet from the oil supply pipe and the said cylinder.

Further constructional features of the invention will be described hereinafter.

One constructional form of the invention is hereinafter described, by way of example, in the accompanying drawings, wherein:

Fig. 1 is an outside elevation of the unit;

Fig. 2 is a sectional elevation of the injector unit on the line A—A in Fig. 1;

Fig. 3 is a section on the line B—B in Fig. 1;

Fig. 4 is a sectional elevation of a metering device which comprises a coiled capillary tube and a single air or gas-filled sack, the outer casing being removed;

Fig. 5 is a modified construction in which the gas or air-filled sac is eliminated and in which the acceptance chamber communicates with a large volume fluid pressure storage vessel;

Fig. 6 shows a modification of the construction shown in Fig. 5, the storage vessel being partially filled and the space between the oil in the vessel and the top of the latter being filled with air or gas;

Fig. 7 is a modification of the construction shown in Fig. 6, in which a spring-urged piston is arranged upon the oil in the storage vessel;

Fig. 8 is a further modification in which the acceptance chamber communicates with a vessel divided into two chambers by a spring-urged diaphragm, the acceptance chamber communicating with one of the chambers and the other chamber being air or gas-filled; and Fig. 9 is a sectional elevation of a modified metering device which is not provided with an acceptance or sac-containing chamber.

Referring first to Figs. 1 to 3:

In this constructional form of the invention, the injector unit comprises a body part 1 which is bored from its lower end to provide a housing 2 for an oil-metering or flow-regulating device 3 as described and claimed in my said prior application No. 223,923 and also described hereinafter the lower end of the bore being threaded at 4 to receive a thread formed externally on the body of the metering device.

The body part of the injector unit is also bored from its upper end to form a cylinder 5 in which a piston 6 is slidably fitted, leakage between the piston and the cylinder being prevented by a packing ring 7 arranged in an annular recess in the piston.

The two bores, which are coaxial, are separated by an intermediate solid part 8 bored transversely to provide a housing 9 for an oil inlet tube 10 which is locked in position in the housing by nuts 11 and is threaded at both ends to receive pipe unions 12 and 13. The tube is formed with an annular recess 14 and with a number of radial ports 15 which connect the recess to the bore 16 of the tube. The annular recess 14 also communicates with an internally-threaded recess 17 formed in the solid part of the body part and connecting the annular recess to the above mentioned cylinder 5. A non-return valve housing 18 is screwed into the threaded recess and it encloses a spring-urged non-return valve 19 which normally closes a port 20 in the housing connecting the latter to the annular recess 14 in the oil-inlet tube 10. A longitudinal passage 21 connects the lower end of the cylinder 5 to the housing 2 in which the metering device 3 is arranged.

The open upper end of the cylinder 5 is closed by a hollow cap 22 which is provided over part of its length with an internal thread by means of which the cap may be screwed upon the upper part of the body part of the injector unit above the solid part 8 of the latter. The upward movement of the piston 6 is opposed by a coil spring 23 which reacts between the piston and the underside of the top of the cap 22 and this outward movement is limited by the abutment of the piston against a tubular stop collar 24 which is integral with, or is fixed to, the cap and extends downwardly from the top of the cap coaxially with the latter. The piston is provided with an upwardly-projecting stem 25 which is slidably guided in the stop collar 24.

It will be appreciated that the cap 22 provides means for varying the upward stroke of the piston and thus for adjusting the quantity of oil which can enter the cylinder 5 from the inlet tube 10. The cap is knurled externally and at its bottom end it is formed with an external flange 26.

In order to indicate the quantity of oil received in the cylinder a longitudinal strip 27 is fixed at its lower end to the intermediate solid part of the body part of the injector unit. The strip, which is provided with a scale of graduations 28 corresponding to the volumes of oil received in the cylinder, is bent over at its upper end 29 so as, by engagement with the flange 26 on the cap, to limit the upward movement of the latter and thus the upward movement of the piston 6. The position of the cap relative to the graduations on the strip is shown by a groove or line 30 provided around the exterior of the flange on the cap. In order to fix the cap in its various adjusted positions against vibrations and so on, a longitudinal blade spring 31 is fixed to the solid part of the body part of the injector unit beneath the strip and the upper end 31a of the spring 31 is bent over and pointed to engage in the knurled part of the cap 22.

Referring to Fig. 4, which corresponds to Fig. 4 of the said prior application No. 223,923 the metering device 3 is like that described and claimed in this prior application; that is to say, it includes a hollow body 32 having an open end which is closed by the filter disc member 33. Within the body there is a coiled metal tube 34 having a bore of capillary dimensions, one end of the tube being open to the bore of the body 32 and the opposite end being fixed in the end of a discharge passage 35 which is normally closed by a non-return valve 36. The discharge passage 35 communicates with an outlet 37 from the metering device which is connected to the bearing or other place of use of the oil. As also shown in Fig. 4, however, between the said discharge passage 35 and the outlet from the body an oil acceptance chamber 38 may be provided containing one or more ring-shaped air or gas filled sacks 39 of plastic or other flexible and resilient material having both ends sealed.

On the other hand, the metering unit may be constructed as described with reference to any of Figures 5 to 8 of the above mentioned prior application and also as shown in Figs. 5 to 8 of the accompanying drawings.

Thus, in one such construction, which is shown in Fig. 5, the acceptance chamber 40 into which oil is discharged from the tube 41 communicates through a lateral passage 42 with a vertical-large-volume, closed pressure storage vessel 43. The vessel, the lateral passage and the acceptance chamber are all filled with oil. The base of the acceptance chamber is formed with an outlet 44 which is closed by a spring-urged check valve 45.

In a modification, shown in Fig. 6, the acceptance chamber 46 and the lateral passage 47 are both filled with oil but the pressure storage vessel 48 is only partly filled with oil, the space 49 in the vessel between the oil and the top of the vessel being filled with gas or air.

In another modification, see Fig. 7, the acceptance chamber 50 and the lateral passage 51 are filled with oil, the pressure storage vessel 52 being only partially filled with oil. A piston 63 fitted with a ring-type gasket 64 is slidably arranged in the vessel. A coil spring 65 reacts between the top of the vessel and the piston and thus exerts pressure on the oil. An air vent 66 is formed in the top of the vessel.

Referring to Fig. 8:

In this further modification the acceptance chamber 67 communicates through a lateral passage 68 with a pressure storage vessel consisting of two parts 69 and 70 containing a resilient diaphragm 71 which is clamped between the two parts of the vessel and thus divides the latter into two chambers 72 and 73. In the chamber 72 there is a coil spring 74 which reacts between the wall 75 of the vessel and the diaphragm, forcing the latter towards the acceptance chamber 67. The chamber 73 in the pressure storage vessel, the lateral passage 68 and the acceptance chamber 67 are filled with oil and the chamber 72 is gas- or air-filled.

It will be appreciated that in certain cases the metering devices may be used without the air- or gas-filled sacks or the equivalent. Fig. 9 shows such a construction which comprises a hollow body 76 in the bore of which there is a capillary tube 77 having its inlet end open to the bore and its discharge end 78 communicating with a discharge passage 79 in the body normally closed by a check valve 80. The open upper end of the body is provided with a filter disc 81.

A number of injector units as described above may be connected in series by oil-supply pipes connected to the unions 12 and 13 on the oil-inlet tubes 10. The oil supply line may be connected to a pump driven manually or by an electric motor which may be started and stopped by a pressure-controlled switch. During the periods when the pump is in operation the pressure-oil is fed through the supply line and through the inlet tubes 10 of the injector units and past the non-return valves 19 into the cylinders 5 of the units. When all the cylinders have received the predetermined quantity of oil, which is determined by the adjustment of the caps 22 on the units, the oil pressure rises to a predetermined degree and the pump motor is then stopped by the action of the said pressure-controlled switch.

The oil received in each of the cylinders 5 is then discharged through the transfer passage 21 into the housing 2 of the metering unit. It then flows into the metering unit body from which it is discharged into the bearing or other place of use after first passing through the coiled capillary tube 34 or 41 and the acceptance or sac-containing chamber. As described in our said copending application No. 223,923, the capillary tubes function to distribute the measured quantities of oil over times depending upon the lengths of the capillary tubes. As the operation of the metering unit has already been fully described in our said application no further description appears to be necessary.

The top of the cap 22 may be provided with a plastic or glass lens 22a which is of comparatively short focus, the purpose of the lens being to bring into the view of the operator the end of the piston stem 25 when the piston 6 is at the top of its stroke, i. e. when the cylinder 5 is filled with oil. This arrangement permits an operator to check whether the injector unit is functioning properly.

I claim:

1. An injection unit comprising a body having a lubricant inlet adapted to be connected to means for alternately supplying lubricant under pressure to said inlet and then relieving lubricant pressure at said inlet, a cylinder in said body, a port connecting said inlet to said cylinder and having a non-return valve therein, a piston slidable in said cylinder, spring means yieldingly urging said piston toward said port, said body providing a housing, a connecting passage permanently connecting said cylinder with said housing, a metering device in said housing and having an outlet disposed outside of said housing, said metering device comprising a hollow body disposed within said housing and open to the interior of said housing and having a discharge passage connected to said outlet, a coiled tube disposed in said hollow body and having a bore of capillary dimensions, said tube having one end open to the interior of the hollow body and having its other end connected to said discharge passage and thus to said outlet, said piston being forced against said spring means to compress the same when lubricant is fed under pressure through said inlet, whereas when the pressure on the lubricant in said inlet is relieved said piston moves inwards to cause lubricant in said cylinder to pass through said connecting passage to said housing and into the hollow body of said metering device and through said coiled tube and said discharge passage to said outlet.

2. A unit as defined in claim 1 wherein a hollow cylindrical cap is threaded onto said body coaxially of said cylinder for adjustment longitudinally with respect to said cylinder and has stop means inside of the cap for variably limiting the lubricant capacity of the cylinder in accordance with the adjusted position of the cap.

3. A unit as defined in claim 1 wherein a hollow cylindrical cap is threaded onto said body coaxially of said cylinder for adjustment longitudinally with respect to said cylinder and has stop means inside of the cap for variably limiting the lubricant capacity of the cylinder in accordance with the adjusted position of the cap; and in which said cap has an inspection window in the end thereof through which operation of said piston may be checked visually.

4. A unit as defined in claim 1 wherein the body has a solid part between said cylinder and said housing in which solid part said connecting passage is formed, and wherein a non-return valve is provided between said discharge passage and said outlet.

5. A unit as defined in claim 1 wherein the body has a solid part between said cylinder and said housing in which solid part said connecting passage is formed, and wherein a non-return valve is provided between said discharge passage and said outlet, and in which an acceptance chamber is provided between said last-mentioned non-return valve and said outlet and wherein a flexible gas-filled sack is located in said acceptance chamber.

References Cited in the file of this patent

UNITED STATES PATENTS

| | | |
|---|---|---|
| 1,673,741 | Fesler | June 12, 1928 |
| 1,696,774 | Martin | Dec. 25, 1928 |
| 1,767,515 | Davis | June 24, 1930 |
| 1,803,601 | Davis | May 5, 1931 |
| 1,807,899 | Davis | June 2, 1931 |
| 2,003,281 | Bijur | June 4, 1935 |

FOREIGN PATENTS

| | | |
|---|---|---|
| 32,302 | France | June 14, 1927 |
| 36,967 | France | May 20, 1930 |
| 295,954 | Great Britain | Feb. 21, 1929 |
| 305,204 | Great Britain | July 18, 1929 |